United States Patent [19]

Loffelman et al.

[11] 4,356,287
[45] Oct. 26, 1982

[54] NOVEL POLYMERIC LIGHT STABILIZERS FOR POLYMERS

[75] Inventors: Frank F. Loffelman, Bridgewater; Thomas E. Brady, Whitehouse Station, both of N.J.

[73] Assignee: American Cyanamid Company, Stamford, Conn.

[21] Appl. No.: 284,881

[22] Filed: Jul. 20, 1981

[51] Int. Cl.³ .................. C08F 26/06; C08L 39/04
[52] U.S. Cl. .................................. 525/204; 524/99; 524/100; 525/203; 526/261; 526/265; 544/198; 544/209; 544/212; 544/219
[58] Field of Search .............. 260/45.8 NT; 525/203, 525/204; 526/261, 265; 544/198, 209, 212, 219; 524/100

[56] References Cited

U.S. PATENT DOCUMENTS 4,108,829 8/1978 Cassandrini et al. ....... 260/45.8 NT
4,210,612 7/1980 Karrer ............................. 525/204
4,276,401 6/1981 Karrer ............................. 526/265
4,288,593 9/1981 Rody ............................... 544/209
4,292,237 9/1981 Layer et al. ..................... 525/203
4,294,963 10/1981 Rody ............................... 544/198

Primary Examiner—John Kight, III
Assistant Examiner—R. A. White
Attorney, Agent, or Firm—Steven J. Hultquist

[57] ABSTRACT

Polymers of the following monomer

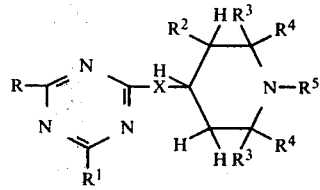

wherein R and/or R¹ contains a polymerizable double bond are disclosed as light stabilizers for polymers.

12 Claims, No Drawings

NOVEL POLYMERIC LIGHT STABILIZERS FOR POLYMERS

This invention relates to certain novel polymeric compositions and to their use as light stabilizers for polymers. More particularly, this invention relates to novel polymeric compositions obtained by the polymerization of a monomer, or a mixture of monomers, represented by formula (I)

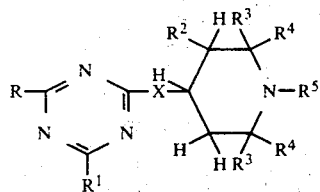

wherein R represents $C_3$-$C_6$ alkenyloxy, $C_3$-$C_6$ alkenylamino, or di($C_3$-$C_6$ alkenyl)amino; $R^1$ represents $C_1$-$C_8$ alkyl, $C_1$-$C_8$ alkoxy, halo, $C_1$-$C_8$ alkylthio, $C_3$-$C_6$ alkenyloxy, amino, $C_3$-$C_6$ alkenylamino, di($C_3$-$C_6$ alkenylamino), the groups

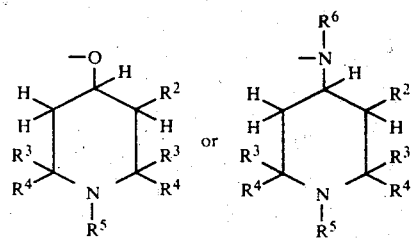

wherein $R^2$, $R^3$, $R^4$, $R^5$, and $R^6$ are as defined below, $C_1$-$C_{18}$ alkylamino, $C_1$-$C_{18}$ dialkylamino, morpholino, piperidino, pyrrolidyl, a substituted $C_1$-$C_{18}$ alkylamino, or a substituted $C_1$-$C_{18}$ dialkylamino, wherein the substituents are selected from amino, cyano, carboxy, alkoxycarbonyl wherein the alkoxy moiety has 1 to 8 carbon atoms, and the groups

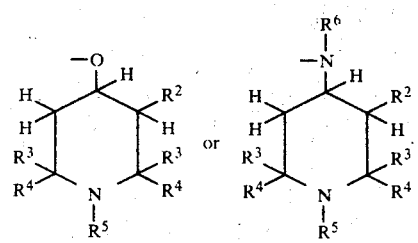

wherein $R^2$ represents hydrogen, $C_1$-$C_8$ alkyl, or benzyl; $R^3$ and $R^4$ independently represent $C_1$-$C_8$ alkyl, benzyl, or phenethyl, or together with the carbon to which they are attached form a $C_5$-$C_{10}$ cycloalkyl; and $R^5$ represents hydrogen, $C_2$-$C_3$ hydroxyalkyl, $C_1$-$C_8$ alkyl, hydroxyl, or oxyl; $R^6$ represents hydrogen, $C_1$-$C_8$ alkyl, or

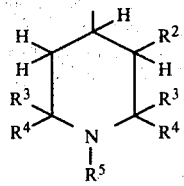

wherein $R^2$, $R^3$, $R^4$, and $R^5$ are as previously defined; X is oxy, or

wherein $R^6$ is as previously defined.

This invention also relates to the use of such polymeric compositions for stabilizing polymers, particularly polyolefins, against degradation by ultraviolet radiation, and to the stabilized compositions.

The preferred monomers of formula (I) are those wherein $R^1$ is

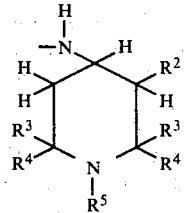

The especially preferred monomer is 2-diallylamino-4,6-bis(2,2,6,6-tetramethyl-piperidinyl)amino-1,3,5-triazine.

It is well-known that sunlight and other sources of ultraviolet radiation cause degradation of polymers as evidenced by embrittlement or yellowing of plastic articles made therefrom. It is also well-known that this degradation can be inhibited by use of ultraviolet light stabilizers incorporated in or on such articles. Various additives, used alone or in combinations, have been suggested to inhibit such light degradation in order to prolong the useful lives of articles made from polymers. Since none has been found to be completely satisfactory, research continues in order to find compounds, or combinations of compounds, which will be more satisfactory. The present invention arose out of such research and resulted in the discovery of novel polymers which stabilize polymers against degradation by ultraviolet light.

The stabilizers of the present invention offer the following advantages:

(1) excellent light-stabilizing activity,
(2) excellent compatibility with resins,
(3) low volatility,
(4) low extractability from polymers by laundering or dry cleaning, and
(5) excellent oven-aging stability.

French Pat. No. 1,507,602 discloses a 2-(4-methyl-1-piperazinyl)-4,6-bis(allyloxy)-1,3,5-triazine.

U.S. Pat. No. 3,925,376 discloses various highly alkylated piperidinyl derivatives of 1,3,5-triazines as stabilizers for polymers.

U.S. Pat. No. 2,712,004 discloses polymerized compositions obtained by polymerizing and copolymerizing various allylmelamines, such as N,N-diallylmelamine.

The monomers of formula (I) may be prepared by reacting a compound of formula (II)

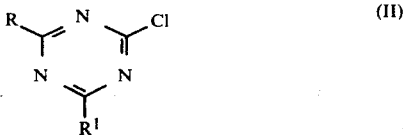

wherein R and R¹ are as previously defined, with a compound of formula (III), or (IV),

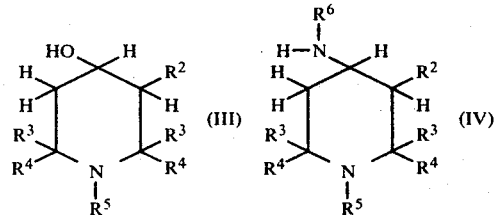

wherein $R^2$, $R^3$, $R^4$, $R^5$, and $R^6$ are as previously defined, by methods well-known in the art.

Illustrative examples of monomers of formula (I) include the following:

2-allylamino-4-amino-6-(1-hydroxy-2,2,6,6-tetramethyl-4-piperidinyl)amino-1,3,5-triazine,
2-allylamino-4-methylamino-6-(2,2,6,6-tetramethyl-4-piperidinyl)amino-1,3,5-triazine,
2-diallylamino-4-t-octylamino-6-(2,2,6,6-tetramethyl-4-piperidinyl)amino-1,3,5-triazine,
2-allyloxy-4-t-octylamino-6-(2,2,6,6-tetramethyl-4-piperidinyl)oxy-1,3,5-triazine,
2-(3-butenyl)amino-4-methoxy-6-(1,2,2,6,6-pentamethyl-4-piperidinyl)amino-1,3,5-triazine,
2-(5-hexenyl)amino-4-n-butoxy-6-(2,6-di-n-butyl-2,6-dimethyl-4-piperidinyl)-amino-1,3,5-triazine,
2-allylamino-4-t-octyl-6-(2,2,6,6-tetraethyl-4-piperidinyl)oxy-1,3,5-triazine,
2-diallylamino-4-methylthio-6-(1-oxyl-2,2,6,6-tetramethyl-4-piperidinyl)amino-1,3,5-triazine,
2-diallylamino-4,6-bis[(2,2,6,6-tetramethyl-4-piperidinyl)amino]-1,3,5-triazine,
2-diallylamino-4-pyrrolidyl-6-(2,2,6,6-tetramethyl-4-piperidinyl)amino-1,3,5-triazine,
2,4-bis(allyloxy)-6-[(1-(2-hydroxyethyl)-2,2,6,6-tetramethyl-4-piperidinyl)amino]-1,3,5-triazine,
2-allylamino-4-diethylamino-6-(2-benzyl-2,6,6-trimethyl-4-piperidinyl)amino-1,3,5-triazine.
2,4-allylamino-6-(2-n-hexyl-2,6,6-trimethyl-4-piperidinyl)amino-1,3,5-triazine,
2-allyloxy-4-didodecylamino-6-(2,2,6,6-tetramethyl-4-piperidinyl)amino-1,3,5-triazine,
2-allyloxy-4-diallylamino-6-(2,2,6,6-tetramethyl-4-piperidinyl)amino-1,3,5-triazine,
2-diallylamino-4-chloro-6-(2,2,6,6-tetramethyl-4-piperidinyl)amino-1,3,5-triazine,
2-allyloxy-4-chloro-6-(2,2,6,6-tetramethyl-4-piperidinyl)amino-1,3,5-triazine,
2-methallylamino-4-methyl-6-(2,2,6,6-tetramethyl-4-piperidinyl)oxy-1,3,5-triazine,
2-allylamino-4-morpholino-6-(2,2,6,6-tetramethyl-4-piperidinyl)amino-1,3,5-triazine,
2-allyloxy-4-piperidino-6-(2,2,3,6,6-pentamethyl-4-piperidinyl)amino-1,3,5-triazine,
2-allylamino-4-(2-hydroxyethyl)amino-6-(2,2,6,6-tetramethyl-4-piperidinyl)amino-1,3,5-triazine,
2-diallylamino-4-methoxy-6-(2,2,6,6-tetramethyl-4-piperidinyl)amino-1,3,5-triazine,
2,4-bis(diallylamino)-6-(2,2,6,6-tetramethyl-4-piperidinyl)amino-1,3,5-triazine,
2-diallylamino-4-t-octylamino-6-(2,2,6,6-tetramethyl-4-piperidinyl)amino-1,3,5-triazine,
2-diallylamino-4-methoxy-6-(7-azadispiro-[5.1.5.3]hexadecan-15-yl)amino-1,3,5-triazine,
2-allylamino-4-(2-cyanoethyl)amino-6-(2,2,6,6-tetramethyl-4-piperidinyl)amino-1,3,5-triazine,
2-methallyloxy-4-(3-carbethoxypropyl)amino-6-(2,2,6,6-tetramethyl-4-piperidinyl)-amino-1,3,5-triazine,
2-allyloxy-4-(6-aminohexyl)amino-6-(2,2,6,6-tetramethyl-4-piperidinyl)-amino-1,3,5-triazine,
2-diallylamino-4-allyloxy-6-methyl-(2,2,6,6-tetramethyl-4-piperidinyl)-amino-1,3,5-triazine,
2-diallylamino-4-t-octylamino-6-bis-(2,2,6,6-tetramethyl-4-piperidinyl)-amino-1,3,5-triazine,
2-diallylamino-4,6-tris(2,2,6,6-tetramethyl-4-piperidinyl)amino-1,3,5-triazine, and
2-diallylamino-4,6-tetrakis(2,2,6,6-tetramethyl-4-piperidinyl)amino-1,3,5-triazine, and the like.

In preparing the polymers of the present invention, a monomer of formula (I), or a mixture of a monomer of formula (I) and a comonomer, is polymerized employing an effective amount of a polymerization catalyst. Suitable polymerization catalysts include 2,2'-azobisisobutyronitrile, di-(t-butyl)-peroxide, dilauryl peroxide, lauroyl peroxide, benzoyl peroxide, acetyl peroxide, t-butyl hydrogen peroxide, ammonium persulfate, potassium persulfate, and the like. The preferred catalyst is 2,2'-azobisisobutyronitrile.

The monomer of formula (I) may be homopolymerized, or copolymerized by utilizing a copolymerizable comonomer, in emulsion or solution by conventional methods. Suitable comonomers are disclosed by Thomas in U.S. Pat. No. 2,712,004, the general disclosure of which is hereby incorporated herein by reference.

The polymers of this invention are useful as light stabilizers for thermoplastic substrates such as polyolefins, polyesters, polyethers, polyurethanes, polystyrenes, high-impact polystyrenes, and the like. Preferably, the thermoplastic substrate is a polyolefin.

Other organic materials susceptible to degradation by the effects of light, the properties of which are improved by the incorporation therein of a polymer of this invention, include natural and synthetic rubbers; the latter include, for example, homo-, co- and terpolymers of acrylonitrile, butadiene and styrene, and blends thereof.

The polymers of this invention are particularly useful in polyolefins, such as polyethylene, polypropylene, polybutylene, and the like, and copolymers thereof.

Generally, the compositions comprise a polymer containing from about 0.1% to about 5% by weight of the polymer of the invention based on the weight of the polymeric substrate.

Preferably, the composition comprises a polyolefin containing from about 0.2% to about 2% by weight of the polymer, based on the weight of the polyolefin.

Optionally, the compositions may contain other additives, especially additives useful in polyolefins, such as antioxidants, supplemental light stabilizers, plasticizers, flame retardants, antistatic and antislipping agents, fillers, dyes, pigments, and the like.

Suitable antioxidants include those of the hindered phenol type, such as 2,6-di-t-butyl-p-cresol; 4,4'bis(2,6-di-t-butylphenol); 4,4'-bis(2,6-diisopropylphenol); 2,4,6-tri-t-butylphenol; 2,2'-thiobis(4-methyl-6-t-butylphenol); octadecyl 2(3',5'-di-t-butyl-4'-hydroxyphenyl)-propionate, etc; esters of thiodipropionic acid, such as dilauryl thiodipropionate and distearyl thiodipropionate, etc; hydrocarbyl phosphites, such as triphenyl phosphite, trinonyl phosphite, diisodecyl pentaerythrityl diphosphite, diphenyldecyl phosphite, etc; and combinations thereof.

Suitable supplemental light stabilizers include those of the benzotriazole class, such as 2-(2'-hydroxy-5-t-octylphenyl)benzotriazole; 2-(2'-hydroxy-3'-5'-di-t-butylphenyl)-5-chlorobenzotriazole; those of the hydroxybenzophenone type, such as 2-hydroxy-4-methoxybenzophenone; 2-hydroxy-4-octyloxybenzophenone; 2,2'-dihydroxy-4,4'-dimethoxybenzophenone; hindered phenol esters, such as n-hexadecyl 3,5-di-t-butyl-4-hydroxybenzoate, and 2',4'-di-t-butylphenyl 3,5-di-t-butyl-4-hydroxybenzoate; metal complexes, such as nickel complexes of 2,2'-thiobis(4-t-octylphenol); nickel butylamine complex of 2,2'thiobis(4-t-octylphenol); nickel complexes of bis(4-t-octylphenyl)sulfone; nickel dibutyl dithiocarbamate; nickel salts of 4-hydroxy-3,5-di-t-butylbenzyl phosphonic acid monoalkyl esters where alkyl is methyl, ethyl, propyl, butyl, etc; nickel complex of 2-hydroxy-4-methylphenyl undecyl ketone oxime, etc. Further illustrative examples of suitable antioxidants and supplemental light stabilizers can be found in columns 3 and 4 of U.S. Pat. Nos. 3,488,290 and 3,496,134 and in the other patents mentioned therein.

As with the polymer of the invention, the additive is advantageously employed within the range from about 0.2% to about 2% by weight, based on the weight of the untreated polymer.

The polymer may be incorporated into the polymeric substrate by any of the known techniques for compounding additives with a polymer. For example, the polymer and the additive may be compounded by dry blending with the substrate in powder or granular form, followed by milling, Banbury mixing, molding, casting, extruding, swelling, and the like. Alternatively, the polymer may be added, as a solution or slurry in a suitable inert solvent, or dispersant, to the polymeric substrate in powder or granular form, the whole mixed intimately in a mixer, and the solvent subsequently removed. As a further possibility, the polymer may be added to the polymeric substrate during the preparation of the latter, for instance at the latex stage of polymer production, to provide prestabilized polymer material.

The following examples illustrate the present invention. All parts and percentages are by weight unless otherwise indicated.

EXAMPLE 1

Polymer from
2-Diallylamino-4,6-bis[(2,2,6,6-tetramethyl-4-piperidinyl)amino]-1,3,5-triazine Dry dioxane (20 grams) is purged with nitrogen for 30 minutes and 2-diallylamino-4,6-bis(2,2,6,6-tetramethyl-4-piperidinylamino)-1,3,5-triazine (12.0 grams) is added thereto. The temperature of the mixture is raised to 70° C. while nitrogen is passed over the surface of the solution. 2,2'-Azobisisobutyronitrile (0.64 gram) is added to the reaction mixture and the temperature is maintained at 70° C., while stirring and passing nitrogen over the surface, for 21 hours and 20 minutes. At this point, 0.17 gram of additional 2,2'-azobisisobutyronitrile is added to the reaction mixture and heating is continued for an additional 3 hours and 10 minutes. At the end of this time, heating is stopped and the viscous reaction mixture is added to petroleum ether. The resulting precipitate is recovered by filtration and dried in a vacuum oven at 75° C. to obtain 5.25 grams of polymer, mp 175°–205° C., having a number average molecular weight of 1600.

EXAMPLE 2

Polymer from
2-Diallylamino-4-t-octylamino-6-(2,2,6,6-tetramethyl-4-piperidinyl)amino-1,3,5-triazine Dry dioxane (14 grams) is mixed with 2-diallylamino-4-t-octylamino-6-(2,2,6,6-tetramethyl-4-piperidinylamino)-1,3,5-triazine (8.0 grams) and the mixture is heated slightly to form a solution. Nitrogen is passed through the solution for 2 hours while stirring. 2,2'-Azobisisobutyronitrile (0.45 gram) is added to the solution and the temperature is increased to 70° C. while stirring and passing nitrogen over the surface of the solution. The solution is stirred at 70° C. for 24 hours and then 0.1 gram of 2,2'-azobisisobutyronitrile is added thereto. Heating is continued at 70° C. for 17 hours and then discontinued. The viscous product is separated from the reaction mixture, dried in a vacuum oven at 80° C., ground, and stirred with petroleum ether. The petroleum ether-insoluble material is recovered by filtration and dried to obtain 3.3 grams of polymer having a number average molecular weight of 1559. The polymer softens at about 160° C. and melts at about 180° C.

EXAMPLE 3

Polymer from
2-Diallylamino-4-methoxy-6-(2,2,6,6-tetramethyl-4-piperidinyl)amino-1,3,5-triazine Dry dioxane (15 grams) is purged with nitrogen for 40 minutes. To the purged dioxane are added 2-diallylamino-4-methoxy-6-(2,2,6,6-tetramethyl-4-piperidinylamino)-1,3,5-triazine (11 grams) and 2,2'-azobisisobutyronitrile (0.5 gram), and the nitrogen is passed above the surface of the resulting mixture. The temperature is increased to 65° C. and the mixture is stirred thereat for 24 hours. At the end of this period, 0.1 gram of 2,2'-azobisisobutyronitrile is added to the reaction mixture and the mixture is stirred at 70° C. for 19 hours. At the end of this time, the reaction mixture is added to petroleum ether and the resulting precipitate is recovered and dried to obtain 5.3 grams of polymer, mp range 160°–185° C., having a number average molecular weight of 1779.

EXAMPLE 4

Polymer from
2,4-bis(Diallylamino)-6-(2,2,6,6-tetramethyl-4-piperidinyl)amino-1,3,5-triazine Dry dioxane (14 grams) is purged with nitrogen for 1.5 hours, and then 2-diallylamino-4-methoxy-6-(2,2,6,6-tetramethyl-4-piperidinylamino)-1,3,5-triazine (9.2 grams) is added thereto and dissolved by warming slightly. 2,2'-Azobisisobutyronitrile (0.45 gram) is added to the solution and the solution is purged with nitrogen for an additional 15 minutes. At this point, the nitrogen flow is directed over the surface of the reaction mixture and the temperature is raised to 63°-64° C. Stirring is continued at this temperature for 25 hours, and then an additional 0.1 gram of 2,2′-azobisisobutyronitrile is added to the reaction mixture. Polymerization is continued at 63°-64° C. for another 24 hours and the reaction mixture is added to petroleum ether. The resulting precipitate is recovered by filtration and dried to obtain 4.67 grams of polymer, mp range 200°-240° C., having a number average molecular weight of 768.

EXAMPLE 5

Polymer from 2,4-bis(allyloxy)-6-(2,2,6,6-tetramethyl-4-piperidinyl)amino-1,3,5-triazine A solution of 50% by weight of 2,4-diallyloxy-6-(2,2,6,6-tetramethyl-4-piperidinyl)amino-1,3,5-triazine (10.00 grams) in dioxane is heated at 75°-80° C. under nitrogen for eight hours and azobisisobutyronitrile (0.10 gram) is then added thereto. Heating at 75°-80° C. is continued and 0.10 gram portions are added after 32 and 46 hours. After 72 hours, the yellow viscous mixture is triturated with hot hexane and filtered to recover a solid. The filter cake is then washed with hot hexane and air dried. The product softens at 150° C.; it has a number average molecular weight of 986.

EXAMPLES 6-10

Testing in Polypropylene

The polymers of Examples 1-5 (0.25 gram) are separately dry blended with a mastermix of 100 grams of unstabilized polypropylene (Pro-fax® 6401) and 0.1 gram of a processing antioxidant, 2,4,6-tri-t-butylphenol. The blend is milled at 350°-370° F. for five minutes, and then compression molded at 400° F. into a film 4-5 mils thick. The film and a control film, identically prepared without the compound under test, are exposed to a xenon arc in an Atlas Weather-Ometer® until they fail. A film is considered as having failed when the carbonyl content of the infrared absorption spectrum increases by 0.10-weight percent, a generally accepted point of film embrittlement.

The data in Table I show the number of hours required to increase the carbonyl content by 0.1% by weight for the compounds under test and a control film.

TABLE I

| Example | Additive | Hours to Failure |
|---|---|---|
| 6 | Product of Example 1 | 800 |
| 7 | Product of Example 2 | 800 |
| 8 | Product of Example 3 | 1400 |
| 9 | Product of Example 4 | 500 |
| 10 | Product of Example 5 | 900 |
|  | None | <200 |

What is claimed is:

1. A polymer prepared by the polymerization of a monomer, represented by formula (I)

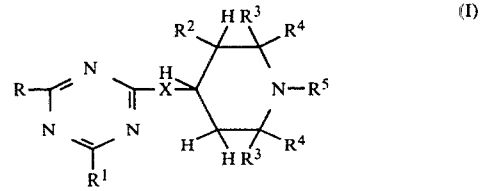

wherein R represents $C_3-C_6$ alkenyloxy, $C_3-C_6$ alkenylamino, or di($C_3-C_6$ alkenyl)amino; $R^1$ represents $C_1-C_8$ alkyl, $C_1-C_8$ alkoxy, halo, $C_1-C_8$ alkylthio, $C_3-C_6$ alkenyloxy, amino, $C_3-C_6$ alkenylamino, di($C_3-C_6$ alkenyl)amino, the groups

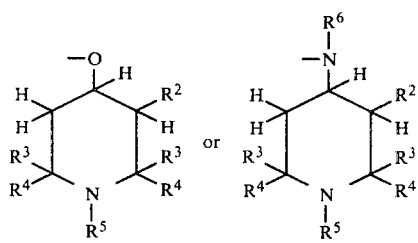

wherein $R^2$, $R^3$, $R^4$, $R^5$, and $R^6$ are as defined below, $C_1-C_{18}$ alkylamino, $C_1-C_{18}$ dialkylamino, morpholino, piperidino, pyrrolidyl, a substituted $C_1-C_{18}$ alkylamino, or a substituted $C_1-C_{18}$ dialkylamino, wherein the substituents are selected from amino, cyano, carboxy, alkoxycarbonyl wherein the alkoxy moiety has 1 to 8 carbon atoms, and the groups

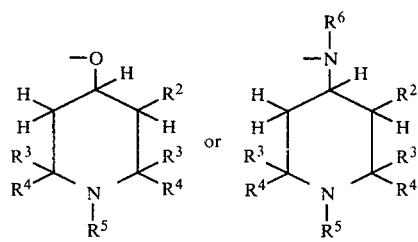

wherein $R^2$ represents hydrogen, $C_1-C_8$ alkyl, or benzyl; $R^3$ and $R^4$ independently represent $C_1-C_8$ alkyl, benzyl, or phenethyl, or together with the carbon to which they are attached form a $C_5-C_{10}$ cycloalkyl; and $R^5$ represents hydrogen, $C_2-C_3$ hydroxyalkyl, $C_1-C_8$ alkyl, hydroxyl, or oxyl; $R^6$ represents hydrogen, $C_1-C_8$ alkyl, or

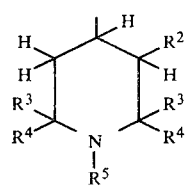

wherein $R^2$, $R^3$, $R^4$, and $R^5$ are as previously defined; X is oxy, or

wherein R⁶ is as previously defined.

2. The polymer of claim 1 wherein R¹ is

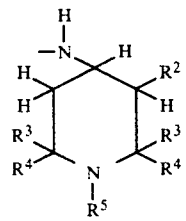

3. The polymer of claim 1 wherein R¹ is

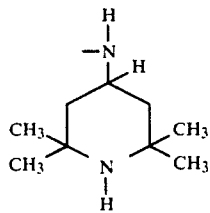

4. The monomer of claim 1 wherein R is

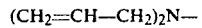
(CH₂=CH—CH₂)₂N—

5. The monomer of claim 1 wherein R is

CH₂=CH—CH₂O—

6. The polymer of claims 1, 4 or 5 wherein R¹ is selected from t-octylamino, methoxy, dialkylamino, alkoxy, and

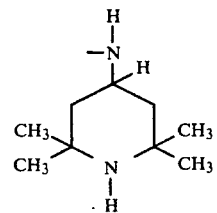

7. A method for stabilizing a polymer which is normally subject to degradation by ultraviolet radiation which comprises incorporating into said polymer an ultraviolet stabilizingly effective amount of a polymer of claim 1.

8. The method of claim 7 wherein the stabilizer is incorporated in a concentration of from about 0.2% to 2% based on the weight of the polymer.

9. The method of claim 7 wherein the polymer is a polyolefin.

10. The method of claim 9 wherein the polyolefin is polypropylene.

11. The method of claim 7 wherein the stabilizer polymer is that of claims 2, 3, 4 or 5.

12. The composition produced by the method of claims 7, 8, 9 or 10.

* * * * *